United States Patent [19]

Mumford

[11] Patent Number: 5,014,133

[45] Date of Patent: May 7, 1991

[54] TELECINE WITH IMPROVED BLEMISH CONCEALMENT

[75] Inventor: Ronald W. J. Mumford, Hitchin, United Kingdom

[73] Assignee: Rank Cintel Limited, England

[21] Appl. No.: 428,115

[22] Filed: Oct. 27, 1989

Related U.S. Application Data

[63] Continuation of Ser. No. 157,327, Feb. 17, 1988, abandoned.

[30] Foreign Application Priority Data

Mar. 6, 1987 [GB] United Kingdom ............... 8705336

[51] Int. Cl.$^5$ .................. H04N 3/30; H04N 5/335; H04N 9/04; H04N 9/07
[52] U.S. Cl. .................................. 358/214; 358/41; 358/49
[58] Field of Search ............... 358/54, 55, 214, 215, 358/216, 217, 225, 226

[56] References Cited

U.S. PATENT DOCUMENTS

| | | | |
|---|---|---|---|
| 2,389,645 | 11/1945 | Sleeper, Jr. | 358/49 |
| 3,693,042 | 9/1972 | Fredkin et al. | 358/214 |
| 4,301,467 | 11/1981 | Jaeger | 358/41 |
| 4,359,757 | 11/1982 | Jaeger | 358/49 |
| 4,680,638 | 7/1987 | Childs | 358/214 |

FOREIGN PATENT DOCUMENTS 2818555 11/1978 Fed. Rep. of Germany .
2140245 11/1984 United Kingdom .

Primary Examiner—James J. Groody
Assistant Examiner—Wendy R. Clements
Attorney, Agent, or Firm—Ostrolenk, Faber, Gerb & Soffen

[57] ABSTRACT

In a method of converting an optical signal into an electronic video signal by means of cathode ray tube ('CRT') scanning means, each image is scanned in a plurality of scanning operations with each scanning operation using a different area of the screen of the CRT scanning means and the signals resulting from the plurality of scanning operations are combined to provide the electronic video signal. Light from the CRT scanning means is passed through deflection means operable to deflect light from respective ones of the plurality of different areas of the screen of the CRT scanning means along the same path into an objective lens so that the same area of a film gate positioned in the optical path beyond the objective lens is scanned in each scanning operation. The output of the CRT scanning means is monitored by means of a photoelectric device operable to provide an output signal when a blemish is detected on the screen of the CRT scanning means. The output signal is applied to an analog-to-digital converter used to process the electronic video signal to cause the video signal level immediately prior to detection of the blemish to be maintained while the blemish persists.

13 Claims, 4 Drawing Sheets

TELECINE WITH IMPROVED BLEMISH CONCEALMENT

This is a continuation of application Ser. No. 07/157,327, filed Feb. 17, 1988, now abandoned.

BACKGROUND OF THE INVENTION

The present invention relates to telecine equipment, in particular, to a method and apparatus for converting an optical signal into an electronic video signal, in which the image is scanned by means of cathode ray tube scanning means.

Telecine equipment is used to convert optical images taken from film into electronic video signals which may be either broadcast directly or recorded on video tape for subsequent transmission. Frequently, conversion is effected in real time, using a 'continuous motion telecine' in which the film is moved continuously past scanning means. However, it is often necessary or desirable to mix the video output of the telecine with other video signals, for example, electronic subtitles or other signals which provide special video effects. Consequently, it is becoming more frequently the case that electronic mixing techniques rather than optical methods are used, the result then being re-recorded.

Where electronic mixing techniques are used, stability of the image during film-to-tape transfer is essential since picture movement cannot be tolerated when mixing electronically-generated information. The results of picture movement are often seen on television when films are transmitted with the addition of electronic subtitles. The picture moves erratically behind steady subtitles. Although modern telecine equipment has been improved by the utilisation of continuous motion sprocketless film transport, there often remains some residual movement of the image.

Consequently, when the best possible picture quality is required, it is necessary to transfer the film to video tape in non-real time. This is achieved by fitting a pin-registered gate to the telecine and operating the system with a special video tape recorder which allows non-real time recording.

The pin-registered gate enables film to be held stationary in the gate by pins which are inserted into the same film sprocket holes as were used by the original film camera. The film transport mechanism of the telecine must be modified where a pin-registered gate is used so that the film is fed through the gate frame-by-frame with an intermittent motion rather than with the more usual continuous motion. The pin-registered gate arrangement is not readily utilized in a line-array CCD telecine where the film motion provides vertical scanning of the image. While it would be possible, by the addition of an oscillating mirror placed in the optical path between the film and the line array sensor, to produce a live image from a line-array CCD telecine, the performance would not be as good. The pin-registered gate is, however, ideally suited to the flying spot telecine as it is capable of producing live images from still pictures.

The use of non-real time scanning where electronic mixing techniques are to be used, or for other purposes, also provides an opportunity for scanning each frame several times for the purpose of improving the signal-to-noise ratio of the telecine output.

The main principle underlying noise reduction is that by averaging the signals from successive scans of the same image, the real or desired picture information is reinforced while the noise, due to its random nature, is reduced by the averaging process. FIGS. 1 and 2 of the drawings shows two simple forms of noise reduction filter.

FIG. 1 is a simple transversal filter. The signals resulting from each of five scanning operations are passed to the filter on input line 10. Each of the blocks 12 is a one picture delay. Once the five scanning operations are complete, the signals are combined by an adder 14 and the resultant signal is then divided by five for transmission or recording. The signal-to-noise ratio is greatly improved by this averaging operation. For example, using only two scans for each image gives a 3 dB improvement.

FIG. 2 shows a typical recursive filter 20. In this type of filter, two multipliers, one (XK) in the input path and the other X(1−K) in the output of picture store 22 X(1−K) control the addition proportions of the signal. The output from the picture store 22 is multiplied and added by means of an adder 24 to the incoming signal resulting from the next subsequent scanning operation. If K=1 then there is no noise reduction. If K=0.1, then a very high degree of signal averaging occurs.

Although both the filter arrangements outlined above are effective in reducing noise electronically generated in the telecine processing channel, they do not reduce noise arising in the flying spot cathode ray tube ('CRT'). Such noise arises from phosphor grains and blemishes on the CRT screen. This type of noise is coherent with the picture information and is therefore built up, with the picture information, in the averaging operations described above.

SUMMARY OF THE INVENTION

In a first aspect the invention provides apparatus for and a method of converting an optical signal into an electronic video signal, in which the image is scanned by means of cathode ray tube ('CRT') scanning means; each image being scanned in a plurality of scanning operations with each scanning operation using a different area of the screen of the CRT scanning means. The signals resulting from the plurality of scanning operations are then combined to provide the electronic video signal.

Preferably telecine apparatus used in the method of the invention includes deflection means disposed in the light path between the CRT scanning means and an objective lens which focusses light from the CRT scanning means onto the telecine film gate. The deflection means are operable to deflect light from respective ones of a plurality of different areas of the screen of the CRT scanning means along the same path into the objective lens.

Although the noise reduction method utilizing different areas of the CRT screen described above improves the image quality considerably, defects caused by phosphor blemish are still present in the image, albeit at reduced intensity.

In a further aspect, the invention provides a method of processing an electronic video signal in telecine apparatus, in which the output of the CRT scanning means is monitored by means of a photoelectric device operable to provide an output signal when a blemish is detected on the screen of the CRT means. The output signal is applied to an analogue-to-digital converter used to process the electronic video signal to cause the video signal level immediately prior to detection of the blemish to be maintained while the blemish persists.

BRIEF DESCRIPTION OF THE DRAWINGS

A method and apparatus in accordance with the invention will now be described in detail with reference to the drawings in which:

FIG. 8b is an enlarged version of part of the diagram of FIG. 8a; and

DETAILED DESCRIPTION OF THE PREFERRED EMBODIMENTS

Figure 3:
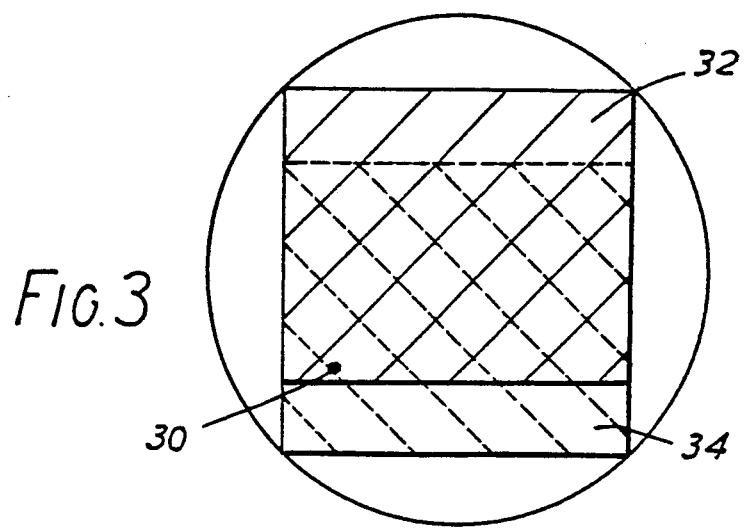
FIG. 3 is a schematic representation of a CRT screen.

The advantages of the method according to the invention can be seen from FIG. 3. A blemish 30 on the screen is close to the lower edge of an area 32 covered by the CRT raster in a first scanning operation. However, it occupies a different position relative to the area 34 of the screen covered in a subsequent scanning operation. When the signals resulting from the two scanning operations are added together, there appear to be two blemishes, each of smaller amplitude.

As mentioned above, if a simple transversal filter is used, with each film frame being scanned twice, the noise will be reduced by 3 dB. Although the single phosphor blemish will now appear at two positions on the picture, each will only be at half the amplitude. The effects from the phosphor grain will also be reduced by the same factor. In general, if the picture is scanned n times, each time using a different area of the CRT screen, each blemish will appear on the picture in n different positions but at only 1/n times the amplitude. Where a simple recursive filter is to be used, the input signal is divided by n.

It will be appreciated that moving the CRT raster from one area of the screen to another will result in a corresponding offsetting of the electronic image produced by each scanning operation. This must be compensated for. A number of possible ways of compensating for the CRT raster movement are possible, for example:

(a) moving the CRT by the same amount but in the opposite direction to that in which the raster patch has moved;
(b) moving the objective lens;
(c) moving the film which carries the image;
(d) inserting an optical deflector in the light path.

The most convenient of these is (d) since it enables the offset to be compensated merely by changing the position of a relatively light piece of optical glass.

Figure 4:
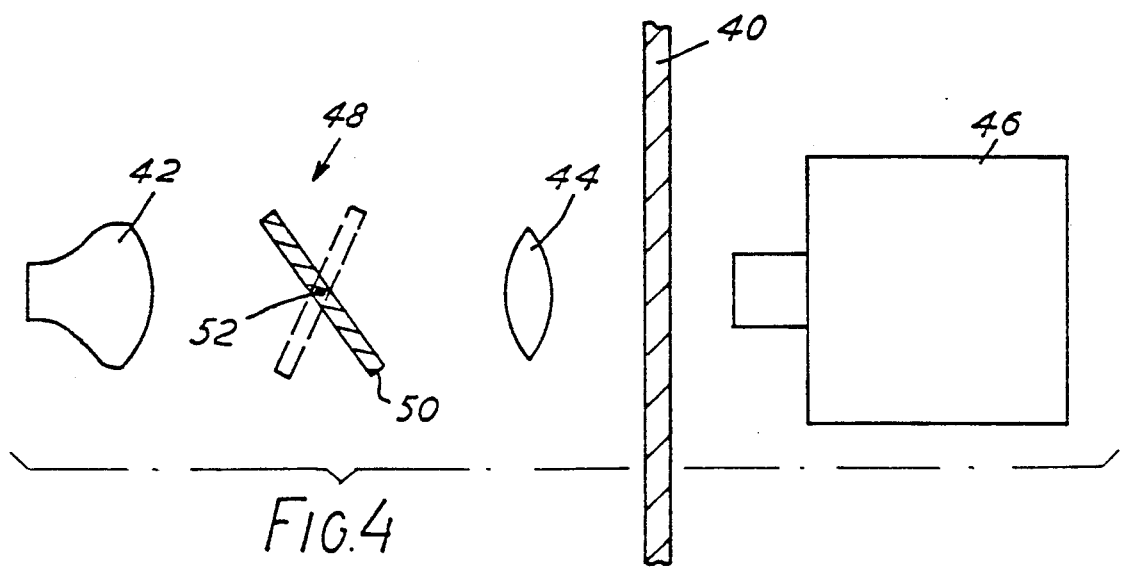
FIG. 4 is a schematic view of a telecine incorporating a deflector in accordance with the invention.

FIG. 4 shows a flying spot telecine for use with CRT scanning means adapted to scan each image two or more times using different areas of the CRT screen. An image on cinema film 40 is illuminated by a flying spot generated by CRT scanning means 42. Light from the CRT scanning means 42 is focussed onto the film 40 by an objective lens 44. The light is then collected and, usually, split into red, green and blue components before being detected and processed by photomultiplier tubes 46 or other photoelectric devices. The telecine shown in FIG. 4 also includes optical deflection means 48 positioned in the light path between the CRT scanning means 42 and the objective lens 44.

The deflection means 48 consists of a glass plate 50 of uniform thickness mounted so as to be pivotable about an axis 52 transverse to the light path.

Figure 5:
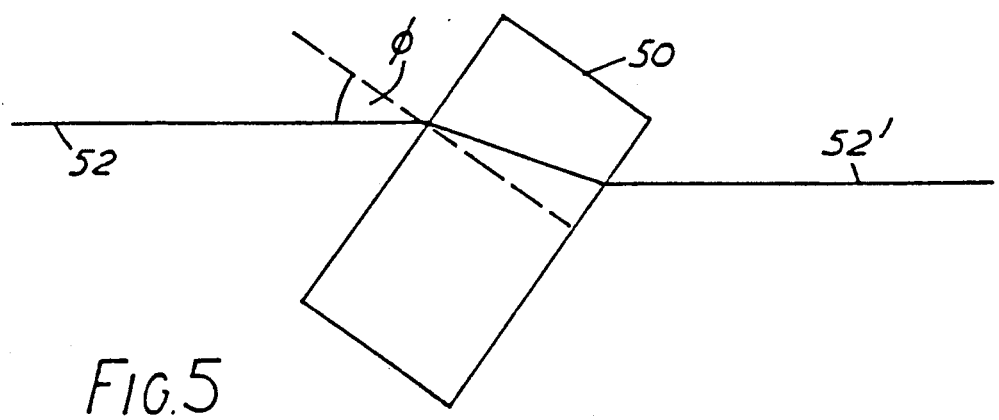
FIG. 5 is a ray diagram of the deflector of FIG. 4.

The manner in which the deflection means operates is illustrated in FIG. 5. The glass plate 50 is tilted, as shown, so that its surface lies at an angle $\phi$ to a plane normal to the incident light beam 52. Light incident on the surface of the plate 50 is refracted as it enters the plate and again on leaving it. Because the plate 50 is of uniform thickness, the light beam 52' is parallel to the incident beam 52 but has been shifted by an amount D. The displacement D is given by the formula:

$$D = t \sin \phi \left( 1 - \frac{n \cos \phi}{n' \cos \phi'} \right)$$

where n is the refractive index of air, n' is the refractive index of the glass of which the plate 50 is made and t is the thickness of the plate 50.

Figure 6:
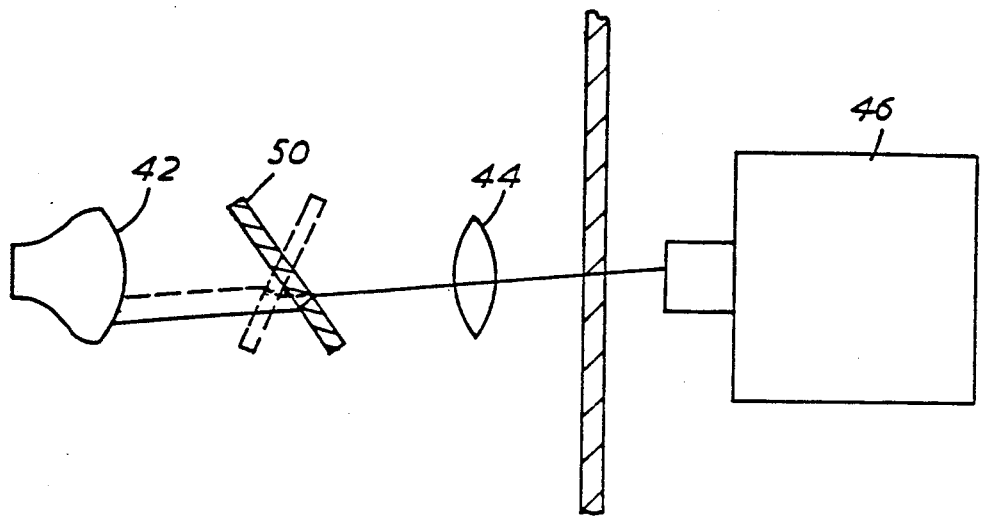
FIG. 6 shows in greater detail the operation of the deflector of FIG. 4.

Thus, as shown in FIG. 6, the plate 50 can be tilted through an appropriate angle to ensure that light from different areas of the screen of the CRT scanning means 42 is displaced by an amount such that it is focussed by the objective lens 44 along the same path into the photodetector means 46. The appropriate angle will be dependent on the thickness of the plate 50, its refractive index and the extent of the displacement required.

One alternative form of deflection means 48 which might be used in place of the plate 50 would be a circular wedge prism. Such a prism would simply be rotated a few degrees at a time to provide the desired offset.

Although the noise reduction method utilizing different areas of the CRT screen described above improves the image quality considerably, defects caused by phosphor blemish are still present in the image, albeit at reduced intensity.

Figure 7:
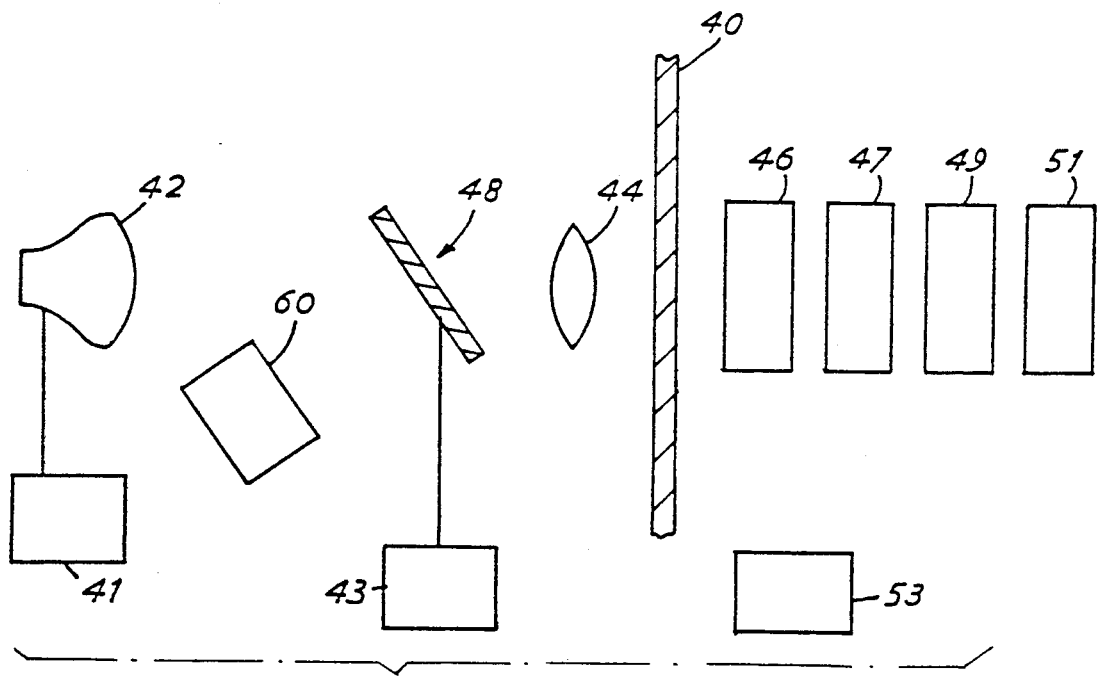
FIG. 7 is a schematic diagram of a flying spot telecine.

In accordance with a further aspect of the invention, the output of the CRT scanning means is monitored by means of a photoelectric device operable to provide an output signal when a blemish is detected on the screen of the CRT means, the said output signal being applied to an analogue-to-digital converter used to process the electronic video signal to cause the video signal level immediately prior to detection of the blemish to be maintained while the blemish persists. Such a method will now be described in detail with reference to FIGS. 7 to 9 of the drawings, in which:

The telecine of FIG. 7 is similar to that shown in FIG. 4 and includes CRT scanning means 42, deflection means 48 and an objective lens 44 which serve to focus light from the CRT scanning means 42 onto a film gate 40. The raster on the CRT is controlled by an amplifier 41 which also sets the position for each of the n scans of each image. As the CRT 42 scans the image n times, the glass plate of the deflection means 48 which moves to n different positions, one for each scan, under the control of control circuit 43.

Figure 1:
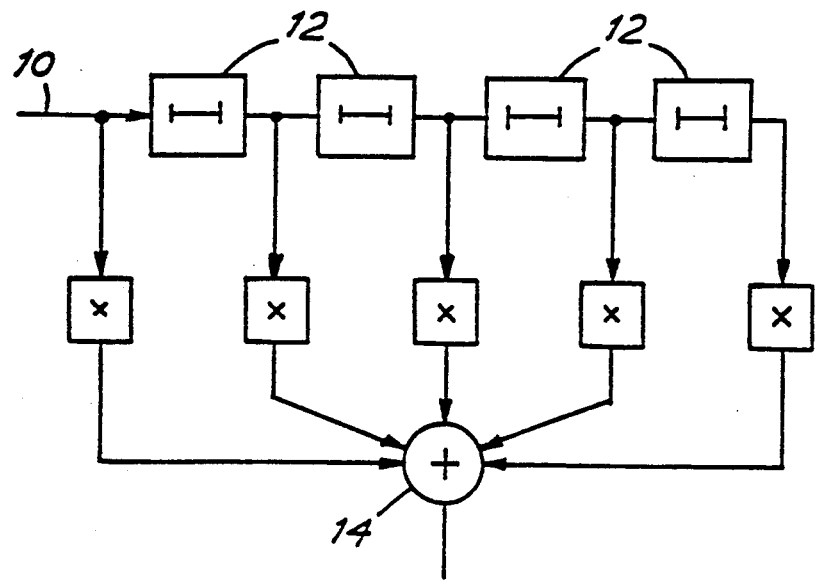
FIGS. 1 and 2 of the drawings shows two simple forms of noise reduction filter according to the prior art.
Figure 2:
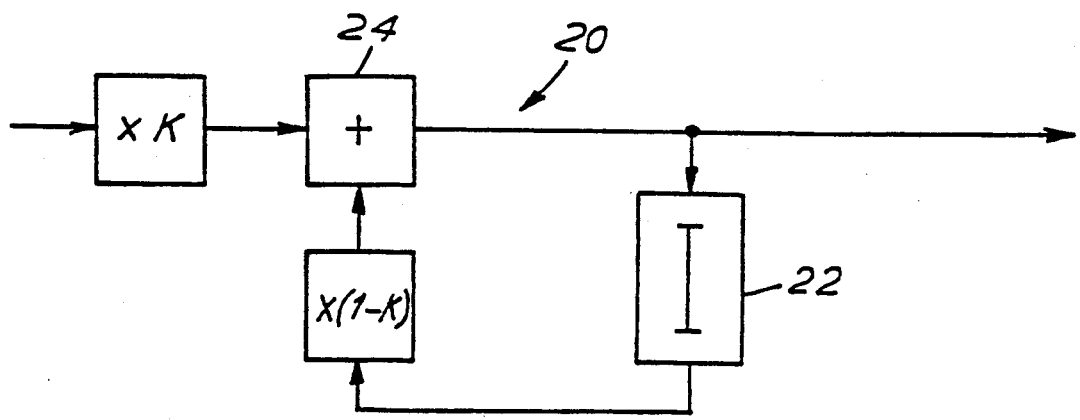

After modulation by the film dyes, the light is split into red, green and blue components and detected by photodetectors 46 to provide red, green and blue output signals. These signals are then passed to processor circuitry 47 which corrects for afterglow and aperture losses. The correction methods used are well-known and are not described in detail here. The output signals from the processor circuitry 47 are passed to analogue-to-digital converters 49 which may provide red, green and blue signals or, if they contain a matrix, Y,U and V signals. The digital signals from the converters 49 are passed to a recursive filter storage system 51 similar to that shown in FIG. 2. The storage system 51 is controlled by a central control unit 53 which also controls the amplifier 41 and the control circuitry 43.

As described above, the output signal from the recursive filter storage system 51 contains the blemishes, each reduced in intensity by a factor n, but appearing in n different places.

By monitoring the output of the CRT 42 separately by means of a photoelectric device 60, any blemish, which will appear as an anomalous reduction in light output, can be detected. An electronic signal indicating the detection of a blemish is then processed and passed to the A/D converters 49. At the converters 49, the signal is used to halt them or to latch their outputs so that the signal level immediately prior to the detection of the blemish is maintained until the blemish flag is removed, that is when the photoelectric device 60 indicates that the CRT raster has moved onto a good phosphor particle.

Figure 8A:
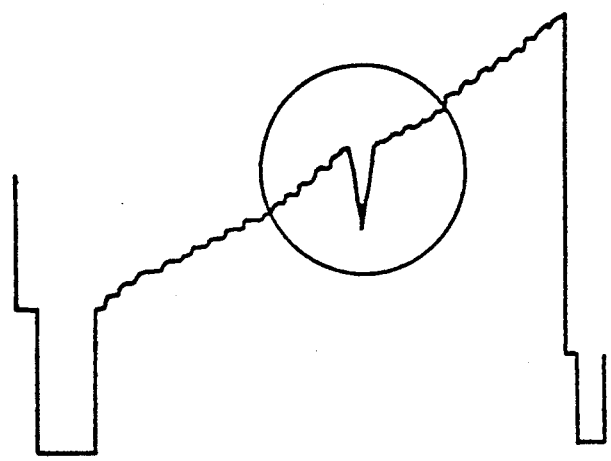
FIG. 8a is a diagrammatic representation of the light output from the CRT screen.
Figure 8B:
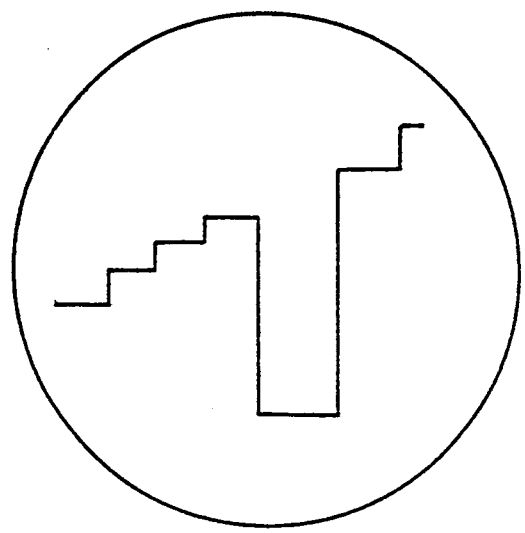
Figure 9:
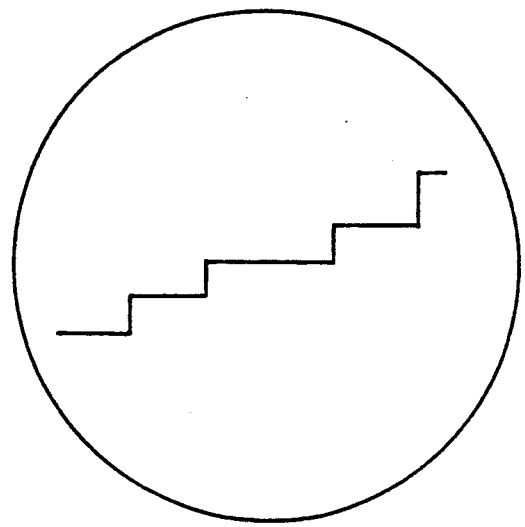
FIG. 9 is a diagrammatic representation of the output signal following correction by the method of the invention.

FIGS. 8a and 8b show the effect of a blemish on the output signal from the converters 49. FIG. 9 shows the same signal after the converter 49 has been stopped as a result of a phosphor blemish being detected at the photoelectric device 60.

The action of the A/D converters under the influence of the photoelectric device 60 will result in (n-1) of the scan samples showing no disturbance in the area of the blemish shown in FIG. 8. Consequently, after processing by the recursive filter 51, the concealment of blemishes will be much improved.

I claim:

1. A method of converting an image into an electronic video signal, the method comprising the steps of:
   scanning the image by means of cathode ray tube ('CRT') scanning means having a screen; the image being scanned in a plurality of temporally successive scanning operations with each temporally successive scanning operation using a different area of the screen of the CRT temporally scanning means than the immediately preceding scanning operation; and
   combining signals resulting from the plurality of temporally successive scanning operations using a recursive filter storage means to provide the electronic video signal.

2. The method of claim 1, further comprising the step of deflecting the light generated by the CRT scanning means by a different amount during each successive one of the temporally successive scanning operations in such a manner that the path of the light, after deflection, is identical for each temporally successive scanning operation despite the fact that different areas of said screen are scanned during each temporally successive scanning operation.

3. The method of claim 1, the method further comprising the steps of:
   monitoring the output of said CRT scanning means by means of a photoelectric device operable to provide an output signal when a blemish is detected on said screen of said CRT scanning means; and
   applying said output signal to an analogue-to-digital converter used to process said electronic video signal to cause the video signal level immediately prior to detection of said blemish to be maintained while said blemish persists.

4. Apparatus for use in converting an image into an electronic video signal, the apparatus comprising:
   CRT scanning means having a screen;
   a film gate;
   an objective lens for focussing light from the CRT scanning means onto said film gate; and
   deflection means disposed in the light path between said CRT scanning means and said objective lens; said deflection means being operable to sequentially deflect light from respective ones of a plurality of different areas of the screen of the CRT scanning means along the same path into the objective lens;
   photosensitive means for receiving said sequentially deflected light and for generating successive output signals as a function thereof; and
   recursive filter storage means for combining said successive output signals.

5. Telecine apparatus, comprising:
   CRT scanning means having a screen;
   a film gate;
   an objective lens for focussing light from said CRT scanning means onto said film gate; and
   deflection means disposed in the light path between said CRT scanning means and said objective lens; said deflection means being operable to sequentially deflect light from respective ones of a plurality of different areas of said screen of said CRT scanning means along the identical path into said objective lens;
   photosensitive means for receiving said sequentially deflected light and for generating successive output signals as a function thereof; and
   recursive filter storage means for combining said successive output signals.

6. The apparatus of claim 5, in which said deflection means includes a plate of transparent material of a uniform thickness and mounted for pivoting movement about an axis transverse to the light path between the CRT scanning means and the objective lens.

7. Telecine apparatus comprising:
   CRT scanning means having a screen;
   a film gate;
   an objective lens for focusing light from said CRT scanning means onto said film gate;
   deflection means disposed in the light path between said CRT scanning means and said objective lens;
   said deflection means being operable to deflect light from respective ones of a plurality of different areas of said screen of said CRT scanning means along the identical path into said objective lens, said deflection means including a plate of transparent material of uniform thickness and mounted for pivoting movement about an axis transverse to the light path between the CRT scanning means and the objective lens.

8. A method of converting an image into an electronic video signal, the method comprising the steps of:
scanning the image by means of a cathode ray tube (CRT) scanning means having a screen;
the image being scanned in a plurality of temporally successive scanning operations with each temporally successive scanning operation using a different area of the screen of the CRT scanning means than the immediately preceding temporally successive scanning operation;
combining the signals resulting from the plurality of temporally successive scanning operations to provide the electronic video signal;
monitoring the output of the CRT scanning means by means of a photoelectric device operable to provide an output signal when a blemish is detected on the screen of the CRT scanning means; and
applying the output signal to an analog-to-digital converter used to process the electronic video signal to cause the video signal level immediately prior to detection of the blemish to be maintained while the blemish persists.

9. A method for processing an electronic video signal in telecine apparatus, the method comprising the steps of:
monitoring the output of a CRT scanning means by means of a photoelectric device operable to provide an output signal when a blemish is detected on a screen of the CRT means; and
applying the output signal to an analogue-to-digital converter used to process an electronic video signal to cause the video signal level immediately prior to detection of said blemish to be maintained while said blemish persists.

10. Apparatus for processing an electronic video signal, comprising:
CRT scanning means;
a photoelectric device operable to provide an output signal when a blemish is detected on the screen of CRT scanning means; and
an analogue-to-digital converter used to process the electronic video signal; said output signal being applied to said analogue-to-digital converter to cause the video signal level immediately prior to detection of the blemish to be maintained while the blemish persists.

11. A method of converting an optical signal into an electronic video signal, the method comprising the steps of:
scanning an image by means of a cathode ray tube ("CRT") scanning means, said image being scanned in a plurality of scanning operations with each scanning operation using a different area of the screen of said CRT scanning means; and
combining signals resulting from said plurality of scanning operations using a recursive filter storage means to provide an electronic video signal.

12. A method of converting an optical signal into an electronic video signal, the method comprising the steps of:
scanning an image by means of a cathode ray tube ("CRT") scanning means having a screen; said image being scanned in a plurality of scanning operations with each scanning operation utilizing a different area of the screen of the CRT scanning means;
combining signals resulting from a plurality of sequential scanning operations to provide an electronic video signal;
monitoring the output of said CRT scanning means by means of a photoelectric device operable to provide an output signal when a blemish is detected on said screen of said CRT scanning means; and
applying said output signal to an analogue-to-digital converter used to process said electronic video signal to cause the video signal level immediately prior to detection of said blemish to be maintained while said blemish persists.

13. Apparatus for use in converting between electronic video signals and images on film, said apparatus comprising:
CRT scanning means having a screen;
a film gate;
an objective lens for focusing light from said CRT scanning means onto said film gate;
deflection means disposed in the light path between said CRT scanning means and said objective lens; said deflection means being operable to deflect light from respective ones of a plurality of different areas of said screen of said CRT scanning means along the identical path into said objective lens, said deflection means including a plate of transparent material of uniform thickness and being mounted for pivoting movement about an axis transverse to the light path between the CRT scanning means and the objective lens.

* * * * *